Patented Aug. 4, 1942

2,292,212

UNITED STATES PATENT OFFICE 2,292,212

AMINO COMPOUND

Joseph B. Dickey and James G. McNally, Rochester, N. Y., assignors to Eastman Kodak Company, Rochester, N. Y., a corporation of New Jersey No Drawing. Application October 5, 1939, Serial No. 298,086

4 Claims. (Cl. 260—574)

This invention relates to ortho or para aryl amino derivatives. More particularly, this invention relates to certain derivatives of aminophenols or phenylenediamines which are particularly use for for photographic or other purposes.

While a number of amino compounds are known and used industrially in dye manufacture, the manufacture of rubber materials and for photographic purposes, in some instances difficulties have been encountered due to the adverse physiological effects experienced from such amino compounds, unsatisfactory solubility characteristics and the like.

We have found several new amino compounds which possess properties rendering them particularly useful for photographic developers, intermediates for the preparation of dyes, inhibitors in gasoline and rubber manufacture. Certain of our novel amino compounds may be employed for photographic purposes including both color and black and white developing.

This invention has for one object to provide certain novel derivatives of aminophenols and diamines. Still another object is to provide nitro olefine of ortho or para substituted aminophenols and diamines. A still further object is to provide certain new amino compounds which are useful in photographic industry, intermediates for the preparation of azo, anthraquinone and indophenol dyes and other industrial purposes. Another object is to provide methods for manufacturing the aforementioned aminophenol and diamine derivatives. Other objects will appear hereinafter.

We have found that novel amino compounds may be prepared by reacting aminophenol or a phenylenediamine with an acetal or nitro alyklene as will be set forth in detail hereinafter. Our compounds comprise an aryl derivative, as for example, a substituted benzene or naphthalene, said substitution comprising a hydroxy or amino group, ortho or para to another amino group in which at least one hydrogen is replaced by a group including the aforementioned nitro olefine groups. In addition to the aforementioned substituents in the aryl nucleus, there may be various other substituents as hydroxy, halogen, alkyl, alkoxy and the like, joined at other points in the nucleus than the ortho or para positions.

In further explanation, some of our novel compounds may be generically illustrated structurally by the following formulas:

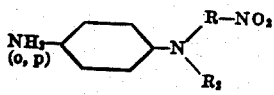 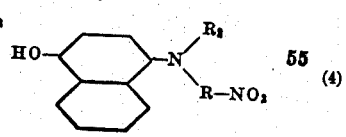

In the aforementioned formulas R is a carbon radical containing one or more carbon atoms such as an alkylene radical. This alkylene radical may be either substituted or unsubstituted; $R_2$ represents hydrogen, alkyl, hydroxy alkyl and the like.

Our invention will be more apparent from the following detailed description. In the manufacturing of our nitro derivatives, for example, a nitro alkylene such as

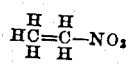

(the hydrogens in the nitro compound may be replaced by substituted or unsubstituted alkyl, alkylenes, cycloalkyl, aryl or heterocylics groups) would be reacted with amino phenol or phenylene diamine.

The nitroalkylenes used in our process may be obtained from various sources. For example, the nitroalkylenes may be prepared as described in Berichte vol 52, p. 898 and vol. 53, p. 204. Or, for example, nitroethylene may be prepared as described in Whitmore's "Organic Chemistry" p. 181. Preferably, however, we would employ the process described in Hasche pending application 280,799, comprising the reaction of a nitroparaffin with formaldehyde. Still further specific details concerning our invention will be observed, from a consideration of the following examples which are set forth for illustrating certain preferred embodiments of our invention:

Example I.—109 gm. p-amino phenol are dissolved in butyl ether with 75 gm. nitroethylene. The reaction mixture is allowed to stand for several hours and the reaction is completed by warming: The reaction product has the formula:

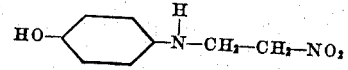

In a similar manner there may be prepared:

(1) 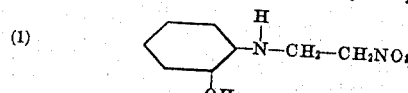

(2) 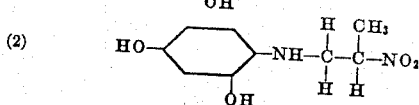

(3) 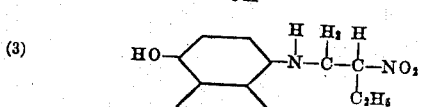

(4) 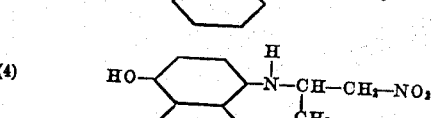

(5) 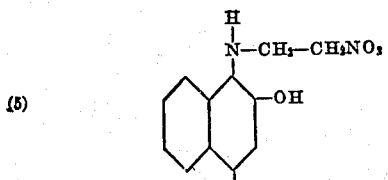

(6) 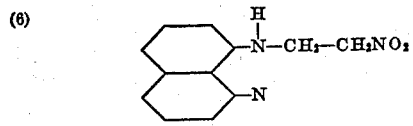

(7) 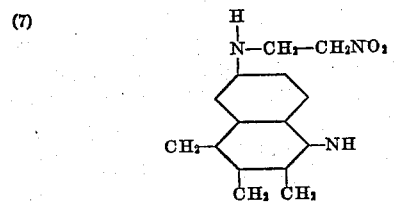

(8) 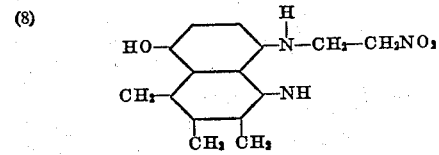

*Example II.*—109 gm. p-phenylenediamine and 75 gm. nitroethylene are reacted in dioxane as in Example I. The reaction product has the formula:

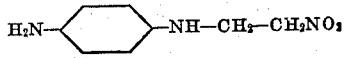

In a similar manner, we may prepare:

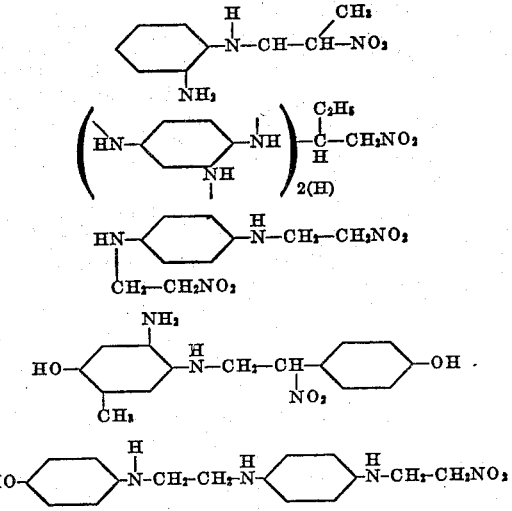

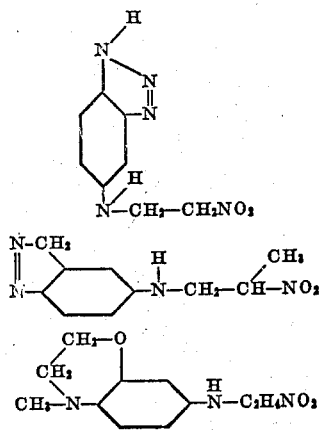

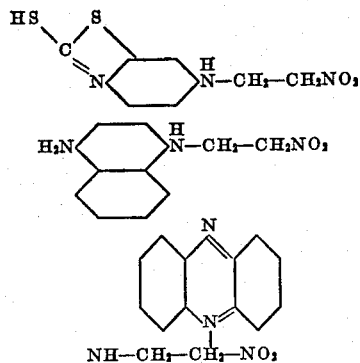

*Example III.*—109 gm. p-amino phenol and 160 gm. β-nitro phenyl ethylene are charged into an autoclave with dioxane and the temperature is slowly raised to 150° for 2 hours.

The bomb is cooled, the reaction products and the dioxane removed. The product is purified by crystallization from alcohol and has the formula:

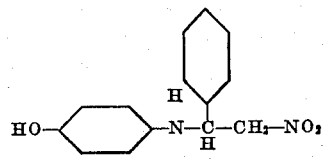

In a similar manner, we may prepare:

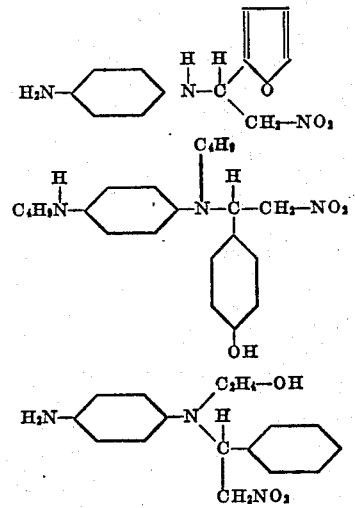

*Example IV.*—155 gm. p-hydroxy butyl aniline and 75 gm. nitro ethylene are reacted in ethyl ether in a manner similar to that illustrated in Example III. The reaction product has the formula:

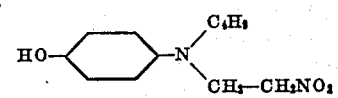

In a similar manner, there may be prepared:

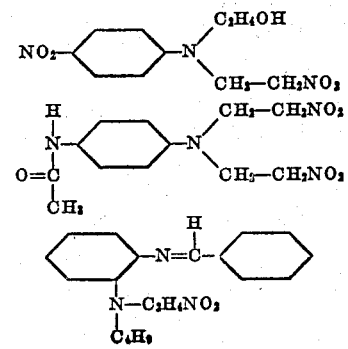

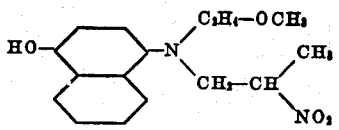

It is apparent from the above examples that a number of aryl compounds such as amino, hydroxy and nitric oxide substituted benzenes or naphthalenes may be reacted with a number of nitro olefines ranging, for example, from nitro ethylene to nitro butylenes and higher and aromatic nitro compounds.

Therefore, we do not wish to be limited in our invention, excepting insofar as may be necessitated by the prior art and the spirit of the appended claims.

What we claim and desire to be secured by Letters Patent of the United States is:

1. A compound having the formula:

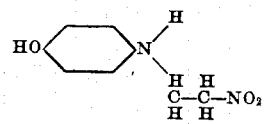

2. A compound having the formula:

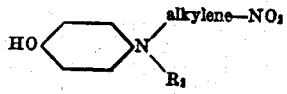

wherein $R_2$ is a member from the group consisting of hydrogen, alkyl, hydroxy alkyl, and alkoxy alkyl.

3. A compound having the formula:

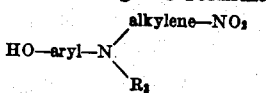

said HO being in a position on said aryl nucleus selected from the group consisting of the ortho and para positions with respect to said nitrogen, and $R_2$ is a member from the group consisting of hydrogen, alkyl, hydroxy alkyl, and alkoxy alkyl.

4. The process of producing compounds of the class defined in claim 3, which comprises dissolving a compound from the group consisting of ortho and para aminophenols in an organic solvent together with a nitro olefine, allowing the mixtures to stand, and thereafter applying heat to said mixture.

JOSEPH B. DICKEY.
JAMES G. McNALLY.